United States Patent [19]

Jessen et al.

[11] Patent Number: 4,546,056

[45] Date of Patent: Oct. 8, 1985

[54] HIGH-TEMPERATURE STORAGE BATTERY

[75] Inventors: Jens C. Jessen, Eppelheim; Dieter Hasenauer, Weinheim, both of Fed. Rep. of Germany

[73] Assignee: Brown, Boveri & Cie AG, Mannheim, Fed. Rep. of Germany

[21] Appl. No.: 670,376

[22] Filed: Nov. 9, 1984

[30] Foreign Application Priority Data

Nov. 9, 1983 [DE] Fed. Rep. of Germany ....... 3340425

[51] Int. Cl.⁴ ............................................. H01M 6/42
[52] U.S. Cl. .................................... 429/149; 429/104; 429/156; 429/160
[58] Field of Search ............................... 429/149–151, 429/148, 104, 156–160

[56] References Cited

U.S. PATENT DOCUMENTS 2,768,230 10/1956 Roberts ................................. 429/156
3,823,037 7/1974 Caiens et al. ..................... 429/150 X
4,044,194 8/1977 Evans et al. ......................... 429/104
4,107,402 8/1978 Dougherty et al. ............ 429/148 X
4,443,523 4/1984 Hasenauer ............................. 429/99

Primary Examiner—Charles F. LeFevour
Attorney, Agent, or Firm—Herbert L. Lerner; Laurence A. Greenberg

[57] ABSTRACT

High-temperature storage battery with at least two or more storage cells of the alkali metal and chalcogen type, with each cell bounded by a metallic housing, and wherein a defined number of storage cells forming a module are combined. The housing of each storage cell is formed by at least two concentrically arranged housing elements, which are separated from each other by electrical insulation, and the storage cells of each module are arranged in a defined manner, and adjacent storage cells are connected to each other at least in some regions via their outer housing elements.

17 Claims, 4 Drawing Figures

HIGH-TEMPERATURE STORAGE BATTERY

BACKGROUND OF THE INVENTION

1. Field of the Invention

The invention relates to a high-temperature storage battery with at least two or more storage cells of the alkali metal and chalcogen type, each cell of which is bounded by a metallic housing, and wherein a defined number of cells are combined to form a module.

2. Description of the Prior Art

High-temperature storage batteries incorporating electrochemical storage cells are used to an increasing degree for the electric propulsion of vehicles.

The high-temperature storage batteries known to date are constructed from a multiplicity of electrochemical storage cells. About 500 storage cells are required to form high-temperature storage batteries which are to have an energy content of about 40 kWh. Such high-temperature storage batteries operate at a temperature of 350° to 500° C. In order to avoid heat losses, the storage cells are surrounded by thermal insulation. On the other hand, however, provision must be made for sufficient cooling within the high-temperature storage battery in order not to exceed the operating temperature of the storage cells and thereby prevent damage thereto.

Special mountings are required to accommodate the number of storage cells mentioned at the outset in the interior of such a high-temperature storage battery. To effect sufficient cooling of the storage cells with a coolant, particularly air, the storage cells must be arranged for adequate coolant to reach the storage cells.

German Published Non-Prosecuted Application No. DE-OS 31 18 693 (U.S. Pat. No. 4,443,523), discloses a high-temperature storage cell which is constructed from several modules. Each module contains 16 storage cells. The storage cells of each module are mounted cantilevered, between the inside boundary wall of the high-temperature storage battery and the upper and lower end faces of the storage cells, leaving empty spaces through which a cooling medium can flow. A clamping element which is rigidly connected to the respective clamping element of the adjacent storage cells is arranged around the upper and lower end of each storage cell. Insulation is arranged between each clamping element and the storage cell. The storage cells of each module are held together by the clamping elements leaving empty spaces between the storage cell, through which spaces the coolant can flow.

A disadvantage of this high-temperature storage battery is that the distance between storage cells of each module is larger than necessary due to the use of the clamping elements and cannot be reduced because the clamping elements require such large spacing.

SUMMARY OF THE INVENTION

It is therefore an object of the invention to optimize the mounting of the storage cells in a high-temperature storage battery by arranging the storage cells in a packing denser than theretofore, without a reduction of the storage cell cooling.

With the foregoing and other objects in view, there is provided in accordance with the invention a high-temperature storage battery containing a plurality of storage cells based on alkali metal and chalcogen, with each storage cell bounded by a metallic housing, and at least four of the cells are combined and connected to each other to form a module, the combination therewith of (a) the housing of each cell comprising two concentrically arranged housing elements which are separated from each other by electrical insulation, and (b) the cells in the module are arranged with each cell having at least two adjacent cells with the outer housings of the cells connected to each other.

Other features which are considered as characteristic for the invention are set forth in the appended claims.

Although the invention is illustrated and described herein as embodied in a high-temperature storage battery, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with the additional objects and advantages thereof will be best understood from the following description when read in connection with the accompanying drawings, in which.

DETAILED DESCRIPTION OF THE INVENTION

Figure 1:
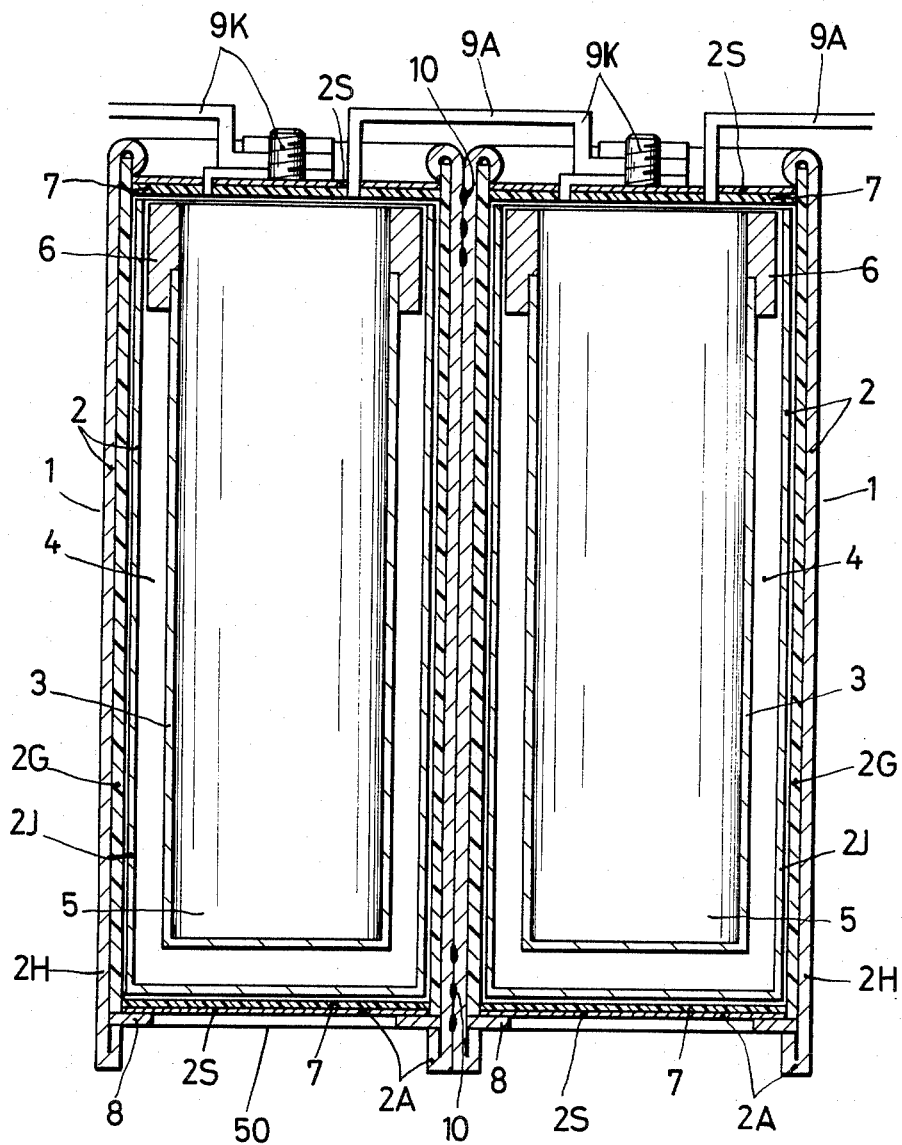
FIG. 1 diagrammatically illustrates in a sectional front view, two storage cells of a module connected to each other.

The invention relates to a high-temperature storage battery which is constructed of two or more storage cells of the alkali metal and chalcogen type. The storage cells arranged within the high-temperature storage battery are combined in modules. According to the invention, the housing of the storage cell comprises two concentrically arranged housing elements which are separated from each other by insulation. The storage cells belonging to a module are arranged so that each module has a linear extent and adjacent storage cells are connected to each other via their outer housing elements. The module can be installed detachably in the high-temperature storage battery via mountings which are fastened to each end of a module.

The invention makes it possible to increase the number of storage cells within a high-temperature storage battery or, if the number of storage cells is kept constant, the dimensions of the high-temperature storage battery can be reduced as compared with known high-temperature storage batteries with the same number of storage cells. According to the invention, each storage cell of a module is insulated electrically from the adjacent storage cells. This insulation is formed by a sleeve of mica or glass, which is arranged between the inner and the outer housing element of each storage cell. The insulation can also be formed by a suitable layer which is applied to the outside surface of the inner housing element or to the inside surfaces of the outer housing element. In addition, each module can be separated from its adjacent modules by electrical insulation. Preferably, a mat of mica placed between two adjacent modules is used for this purpose. The storage cells of each module are arranged to form empty spaces between adjacent storage cells. The empty spaces extend along the entire length of the storage cells and make it possible to conduct a coolant therethrough. The coolant is preferably cooling air.

The modules are mounted to form empty spaces between the upper and the lower end faces of the storage cells through which cooling air can flow. The cooling air flowing through the empty spaces is fed into the empty spaces between the storage cells of the modules. In particular, the feeding of cooling air is accomplished, for instance, from the empty space arranged above the storage cells. The cooling air, after passing between the storage cells is then discharged via the lower empty space. The dimensions of the empty spaces between the storage cells of the module are sufficiently large to cause no appreciable pressure drop of the cooling air within the space.

A further advantage of the invention resides in the reduction of the axial temperature difference, which is achieved by making the cell housing of each storage cell of several part and also of different materials. In addition, an insulating material is arranged between the housing elements, in particular, a mica tube. According to the invention, the inner housing element which is one part of the cell housing is made of aluminum or another metallic material. The outer housing element which is another part of the cell housing can be made of steel, precipitation-hardened aluminum, titanium or nickel. A particularly small temperature difference along the storage cell is achieved if the inner housing element is made of aluminum, the outer housing element of steel and one of the above-described insulations is disposed between the inner and outer housing elements. The insulation damps the cooling. The inner housing element of aluminum, due to its good heat conduction, effects temperature equalization resulting in a fairly uniform temperature of the inner aluminum housing which facilitates uniform cooling of the storage cell. Each storage cell can be removed individually from a module and replaced. Each module can be removed from the high-temperature storage battery independently of the adjacent modules, and replaced into the former. By means of the invention, particularly by the special design of the storage cells and their connections to form a module, there is obtained, for instance, a high-temperature storage battery with an energy content of 18 kWh which has a specific energy, referred to the weight or power, respectively, of 125 Wh/kg and 130 W/kg. The volume-related energy and power of such a high-temperature battery is 130 Wh/l and 135 W/l, respectively.

The invention will be explained in the following with reference to the drawings.

FIG. 1 shows two storage cells 1 and 50, both of which are of identical design, and therefore only the design of storage cell 1 will be explained in detail. The storage cell 1 is bounded outwardly by a metallic housing 2 which is of cup-shaped design. The metallic housing 2 comprises an inner housing element 2I and an outer housing element 2A. Insulation 2G is arranged between the inner housing element 2I and the outer housing element 2A. The insulation is in the form of a sleeve of mica. The inner housing element 2I is cup-shaped and made preferably of aluminum. Its dimensions are chosen to permit the insulation 2G to be disposed between it and the outer housing element 2A. The insulation 2G may also be formed by a suitable coating, which is applied to the inside surfaces of the outer housing element 2A or to the adjacent surfaces of the inner housing element 2I. The outer housing element 2A is made of several parts. In particular, the outer housing element comprises a cylindrical enclosure 2H and two discs 2S. The cylindrical enclosure 2H limits the inner housing element 2I in the region of its lateral surfaces, while the two discs 2S seal the storage cell at its upper and lower ends. The enclosure 2H and the two discs 2S are preferably made of steel. However, they can also be made of precipitation-hardened aluminum, titanium or nickel. The inner housing element 2I serves for conducting the electric current, while the outer housing element 2A assumes primarily a support function for the inner housing element. The outer housing element 2A is made with very thin walls. In the embodiment example shown here, the cylindrical enclosure 2H and the two discs 2S have a wall thickness of about 0.2 mm. The cup-shaped solid electrolyte 3 is arranged in the interior of the storage cell 1. The dimensions of electrolyte 3 are chosen to provide a coherent space between it and the inner housing element 2I which, in the embodiment example shown here, serves as the cathode space 4. The latter is filled with a graphite impregnated with sulfur, not shown. The interior of the solid electrolyte 3 which serves as an anode space contains in the embodiment example shown here, liquid sodium, not shown here. The solid electrolyte 3 is connected at the upper end via glass solder, not shown, to an insulating ring 6 which is made of alpha-aluminum oxide. The insulating ring 6 is shaped to form an outward-pointing flange. The lateral boundary surfaces of the insulating ring 6 are firmly connected to the inner housing element 2I, specifically to its inside surfaces. The connection between the insulating ring 6 and the inner housing element 2I can be made, for instance, by means of thermocompression. The anode space 5 is sealed by an insulating disc 7 which rests on the insulating ring 6. The disc 2S is placed on this insulating disc 7. The disc 2S belongs to the outer housing element 2A, which forms the seal of the storage cell to the outside and serves at the same time as a supporting element. The insulating disc 7 can be made, for instance, of mica. The disc 2S is made of the same material as the other parts of the outer housing element 2A. The edge of the cylindrical enclosure 2H is beaded-over inward for the purpose of retaining the disc 2S on the surface of the storage cell 1. To this end, the dimension (length of the cylinder) of the enclosure 2H is chosen so that it extends beyond the inner housing element 2I upward as well as downward by a few millimeters.

At the lower end of the storage cell, an insulating disc 7 made, for instance of mica, is set against the bottom of the inner housing element 2I. The disc 2S which belongs to the outer housing element 2A and functions as a support is placed under this mica disc 7. These two discs 2S and 7 are held by a lock washer 8 which is provided with projections at its circumference. At the height of the ring 8, the inside surface of the enclosure 2H is provided at appropriate points with recesses into which the projections of the ring 8 can snap. In addition, the two discs 2S and 7 are held by the enclosure 2H which is inwardly beaded-over. The beading-over at this end is not made, however, as wide as at the upper end of the storage cell for the purpose of more readily detaching the lock washer 8, if desired, to remove the two discs 2S and 7 and take out the inner housing element 2I together with the solid electrolyte 3 therein. The cathodic terminal 9K and the anodic terminal 9A are provided at the upper end of the storage cell. The storage cell 1 can be connected to further storage cells 50 in an electrically conducting manner via the terminals.

The storage cell 1 can be firmly connected to further storage cells via its outer housing element 2A and in particular the enclosure 2H. FIG. 1 shows a further storage cell 50 which is similar to the storage cell 1. As can further be seen in FIG. 1, the two storage cells 1 and 50 are firmly connected at the upper and lower ends of their two enclosures 2H by spot welds 10. This is a purely mechanical connection. Since insulation is arranged between the outer housing element 2A and the inner housing element 2I, the two storage cells 1 and 50 are not connected to each other electrically.

Figure 2:
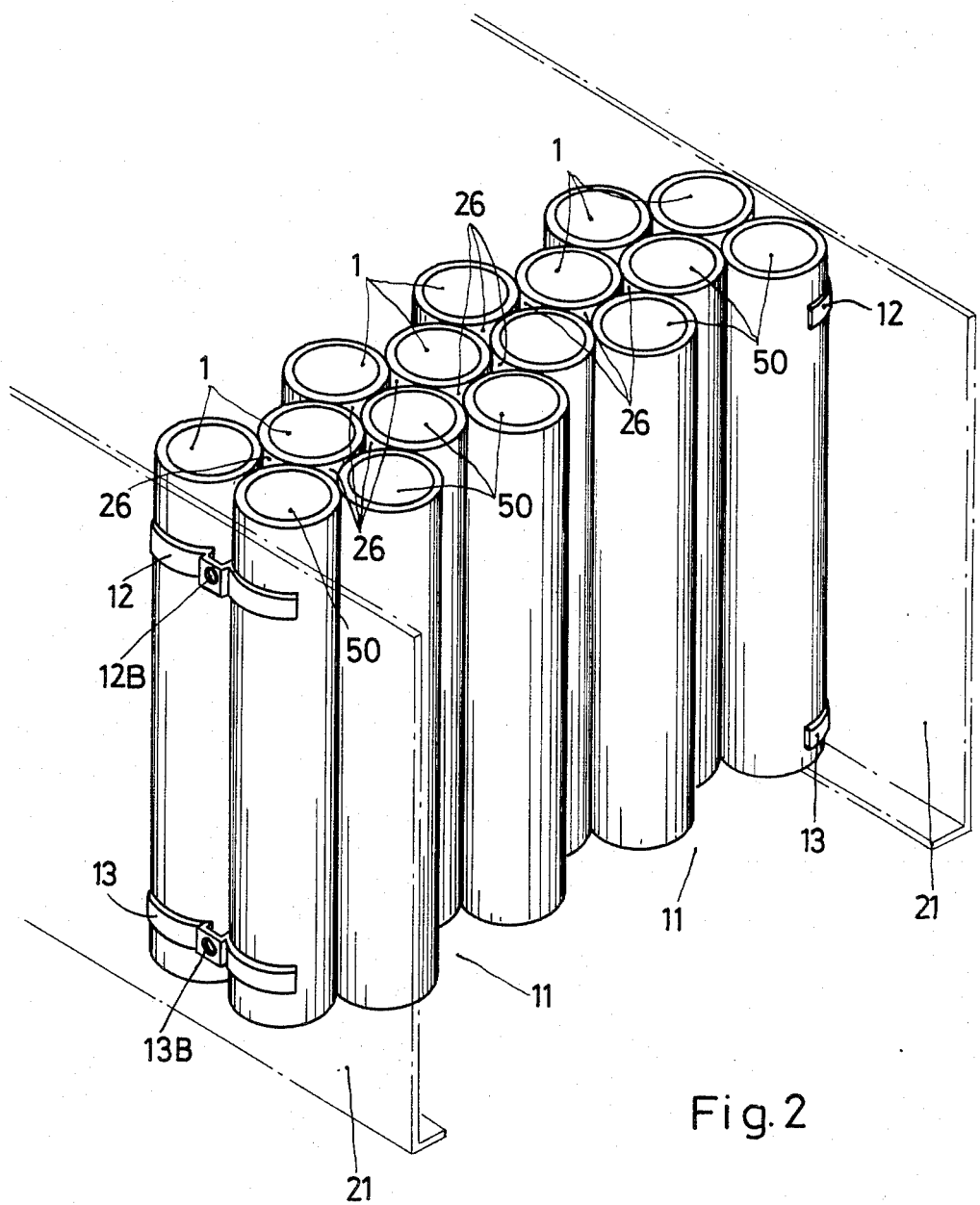
FIG. 2 shows the arrangement of storage cells in one module.

By connecting, according to the invention, the storage cells via their outer housing elements, the cells can be combined in a module 11, as shown in FIG. 2. The module 11 shown here has 16 storage cells 1 and 50. The storage cells are arranged so that the module 11 extends in the longitudinal direction. To achieve an optimally dense packing of the storage cells within a high-temperature storage battery, the storage cells are arranged with two storage cells 1 and 50, positioned in a plane perpendicularly to the longitudinal axis of the module 11. The next pair of storage cells 1 and 50 is positioned with the storage cell 1 or 50, arranged facing gaps, i.e it is inserted, at least in some areas, into the depression formed between the first two storage cells 1 and 50. The four storage cells 1 and 50 are connected mechanically to each other in the upper and lower region of their enclosures 2H by spot welding 10, not shown. The two storage cells 1 and 50 are followed by another pair of storage cells 1 and 50, where again a storage cell 1 or 50 is placed facing the gap, while the second storage cell 1 or 50 is arranged somewhat offset relative to this gap. Directly adjacent storage cells 1 and 50 are connected via their outer housing elements 2H.

By thus connecting the storage cells according to the invention, the storage cells belonging to the module 11 are packed as densely as possible. An empty space 26, through which a cooling medium can be conducted is formed between three each directly adjacent storage cells 1 and 50. The storage cells connected to each other in this manner form an assembly which can be fastened in a cantilevered manner within the high-temperature storage battery via mountings which are provided at the ends of the module 11. The mounting elements are, as can be seen from FIG. 2, W-shaped mounting elements 12 and 13 which partly surround the storage cells 1 and 50 arranged at the ends of the module 11. The mounting elements 12 and 13 are fastened to the upper and lower ends of the pair of storage cells located there. Preferably, the mounting elements are welded to the outer housing elements of these storage cells 1 and 50. In the region between the two storage cells, the mounting elements 12 and 13 have at least one hole 12B or 13B, through which a screw, not shown here, is moved to fasten, the mounting elements 12 and 13 to the inner boundary wall of the high-temperature storage battery or to a mounting frame 21.

Figure 3:
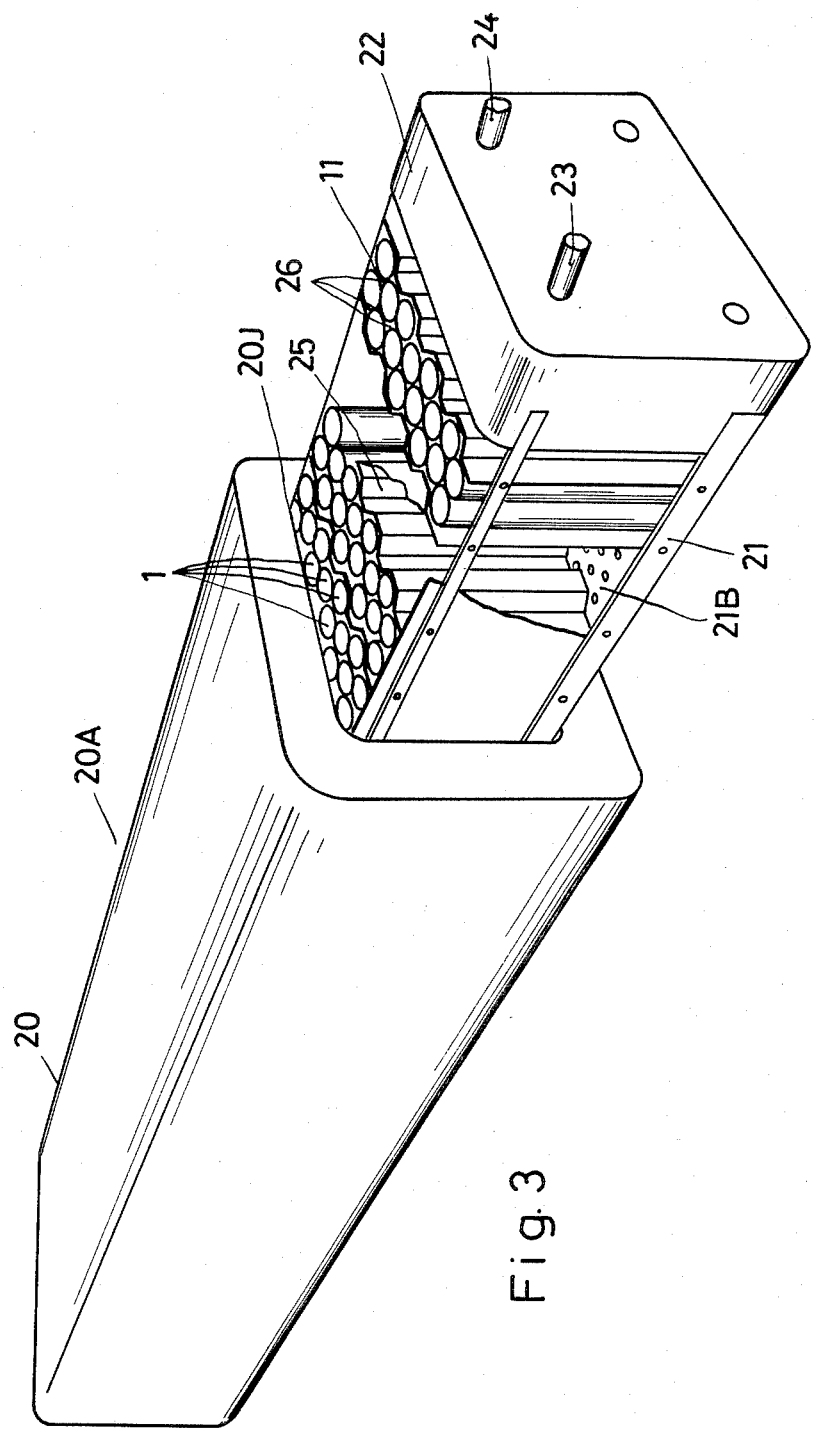
FIG. 3 shows a high-temperature battery with the mounting frame supporting the modules partially pulled out of the storage battery housing.

In FIG. 3 is shown a high-temperature storage battery which is assembled from the modules 11 according to the invention. The high-temperature storage battery has a double-walled housing 20 made of metal. The spacings between the outer housing wall 20A and the inner housing wall 20I are filled with insulating material, not shown here. The interior of the housing 20 serves for accommodating the storage cells. The modules used for the assembly of the high-temperature storage battery are arranged within a box-shaped mounting frame 21 which can be placed like a drawer in the interior of the housing 20 and can similarly also be removed therefrom. A plug 22 is fastened at the end face of the mounting frame 21 by means of which the opening in housing 20, and in particular, the opening at the end face of the housing 20 through which the mounting frame 21 can be removed from the battery, can be closed. The interior plug 22 is filled with insulating material. Plug 22 has openings through which the electrical connecting lines 23 and the leads and discharge lines for the cooling air 24 are brought. As can be seen from FIG. 3, the modules 11 are arranged in the mounting frame 21 with the longitudinal axis of the modules 11 perpendicular to the longitudinal axes of the mounting frame 21. The modules 11 are bolted to the lateral boundary surfaces of the holding frame 21 via mounting elements 12 and 13, not shown here. The modules 11 are screwed at the lateral boundaries of the mounting frame 21 such that the lower boundary surfaces of the storage cells are a defined distance from the bottom of the mounting frame 21. Thereby, a continuous empty space between the bottom 21B of the mounting frame 21 and the lower boundary surfaces of the storage cells is formed. The bottom 21B of the mounting frame 21 is provided with openings through which a coolant can pass. The interior of the battery has an empty space between the upper end of the storage cells and the inner boundary wall 20I of the housing 20 through which a coolant, particularly air, can flow.

An insulating layer 25 is arranged between two adjacent modules 11 as can be seen from FIG. 3. The insulating layer 25 extends along the entire length of the modules 11. Its height is matched to the height of the storage cells 1. Preferably, the insulating layer 25 is formed from a mica or fiber glass foil.

As can be seen from the module 11 arranged in the high-temperature storage battery, empty spaces 26 remain between the storage cells combined to form a module, especially between adjacent storage cells. These empty spaces extend from the upper to the lower end of the storage cells. Empty spaces 26 are in direct communication with the empty spaces arranged above and below the storage cells, through which the cooling medium for the storage cells is conducted. For example, the coolant provided for cooling the storage cells may be introduced into the empty space arranged underneath the storage cells. From there, the cooling medium flows into the empty spaces 26 between the storage cells of each module, where it absorbs the heat given off by the storage cells. At the upper end of the storage cells, the coolant discharges from the top of empty spaces 26 into the empty space above the storage cells, and from the empty space above the storage cells flows to the exit opening within the high-temperature storage battery.

Figure 4:
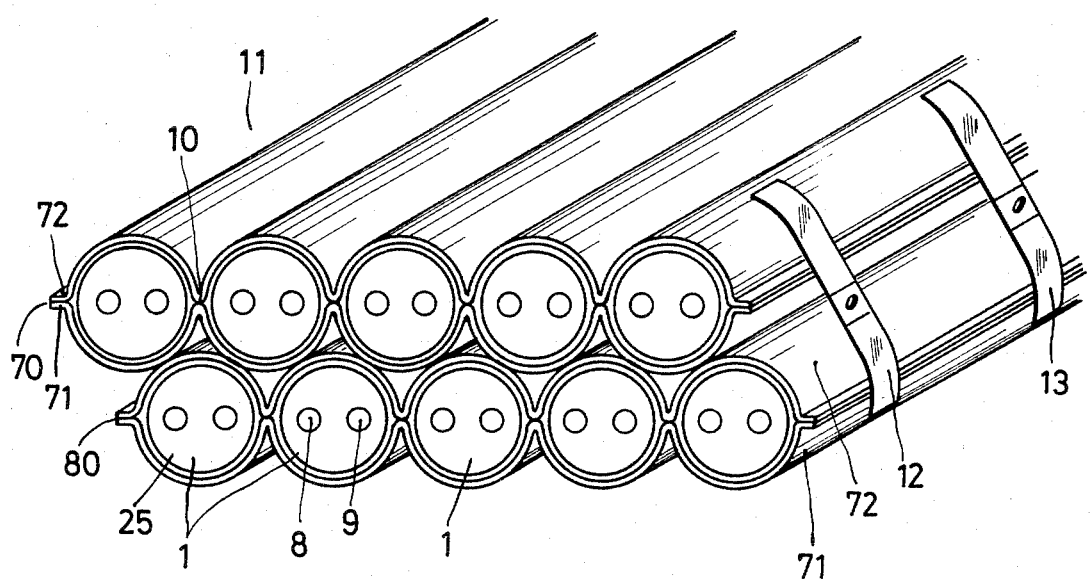
FIG. 4 is a variant of the module assembly.

A variant of the module shown in FIG. 2 is depicted in FIG. 4. The module here has only 10 storage cells. The number of storage cells can be increased to 16, if required, or can be reduced to a smaller number. In forming the module 11, five storage cells are always arranged one after the other in a row. Two rows of storage cells 70 and 80 are formed which are arranged parallel to each other and in close contact. The two rows of storage cells 70 and 80 are offset such that the storage cells of the row 80 are partially arranged in interspaces of the storage cell row 70. The outer housing elements of the storage cells 1 are not formed here by individual sleeves 2H, but instead, the storage cells of row 70 are surrounded on both sides by thin plates 71 and 72 during the fabrication of the module 11. The height of the two plates 70 and 71 is matched to the height of the storage cells. The two plates 70 and 71 are made, for instance, of steel, but can also be made of another temperature resistant material. Each of the two plates 71 and 72 are formed to surround the storage cell 1 completely over half of its circumference. Between two successive storage cells, the two plates 71 and 72 are joined by spot welding 10. The two plates 71 and 72 are, likewise, connected to each other at the two ends of the module 11, whereby the storage cells 1 located at the ends are also surrounded by the two plates 71 and 72 in sleeve-fashion. The storage cells of the row 80 are surrounded, similarly to the storage cells of row 70, by two plates 71 and 72, which form the outer housing elements 2A of the storage cells 1.

The inner housing elements of the storage cells 1 are made of aluminum and are designed in the same manner as the inner housing elements of the storage cells shown in FIGS. 1–3. The upper and lower boundary of the storage cells 1 is formed again here by a disc 2S, which is made of the same material as the plates 71 and 72. Deviating from the embodiment examples shown in FIGS. 1 to 3, the discs 2S are not held by the inward beading of the outer housing elements, but by a lock washer 8 such as is shown in the embodiment of FIG. 1 and is explained in the corresponding description. The lock washers 8 have projections which are arranged on their circumference. The projections (not shown here) are snapped into recesses which are located in the inside surfaces of the plates 71 and 72. Each storage cell has electric terminal elements 9A and 9K, via which each storage cell can be wired electrically to the adjacent storage cells. Two mounting elements 12 and 13 are again provided at the two ends of the modules 11, by means of which the module can be supported in a cantilevered manner within the high-temperature storage battery (not shown here).

The foregoing is a description corresponding, in substance, to German application No. P 33 40 425.9 dated Nov. 9, 1983, international priority of which is being claimed for the instant application, and which is hereby made part of this application. Any material discrepancies between the foregoing specification and the specification of the aforementioned corresponding German application are to be resolved in favor of the latter.

There are claimed:

1. High-temperature storage battery containing a plurality of storage cells based on alkali metal and chalcogen, with each storage cell bounded by a metallic housing, and at least four of the cells combined and connected to each other to form a module, the combination therewith of (a) the housing of each cell comprising two concentrically arranged housing elements which are separated from each other by electrical insulation, and (b) the cells in the module are arranged with each cell having at least two adjacent cells with the outer housings of the cells connected to each other.

2. High-temperature storage battery according to claim 1, wherein the inner housing element is cup-shaped and is made of metal; the outer housing element comprises a cylindrical enclosure and two discs which terminate the storage cell at the top and the bottom; and the cylindrical enclosure and the discs are made of a metal selected from the group consisting of steel, precipitation-hardened aluminum, nickel and titanium.

3. High-temperature storage battery according to claim 2, wherein the inner housing element is made of aluminum.

4. High-temperature coating according to claim 3, wherein the insulation between the cylindrical portions of the two housing elements is a coating of mica or glass on at least one of the two surfaces consisting of the inside surface of the cylindrical enclosure and the outside cylindrical surface of the inner housing element.

5. High-temperature storage battery according to claim 3, wherein several storage cells in a module are arranged one after the other in a row, wherein the outer housing elements of the storage cells in the row are two plates which are set against each other, enclosing the storage cells between the two plates and surrounding them in sleeve-fashion, and wherein the two plates are connected between two adjacent storage cells of a row.

6. High-temperature storage battery according to claim 3, wherein each module has the storage cells arranged therein such that the module has a linear extent and maximally two storage cells are arranged in a plane which is perpendicular to the longitudinal axis of the module.

7. High-temperature storage battery according to claim 3, wherein the storage cells of each module are arranged one after the other in pairs such that one storage cell of the next-following pair faces the gap formed between the two storage cells of the first preceding pair; and wherein the outer housing elements of adjacent storage cells are connected to each other by spot welding in the upper and lower region of the storage cells.

8. High-temperature storage battery according to claim 2, wherein the insulation between the cylindrical portions of the two housing elements is a sleeve of mica or glass.

9. High-temperature storage battery according to claim 1, wherein the insulation between the cylindrical portions of the two housing elements is a sleeve of mica or glass.

10. High-temperature coating according to claim 1, wherein the insulation between the cylindrical portions of the two housing elements is a coating of mica or glass on at least one of the two surfaces consisting of the inside surface of the cylindrical enclosure and the outside cylindrical surface of the inner housing element.

11. High-temperature storage battery according to claim 1, wherein several storage cells in a module are arranged one after the other in a row, wherein the outer housing elements of the storage cells in the row are two plates which are set against each other, enclosing the storage cells between the two plates and surrounding them in sleeve-fashion, and wherein the two plates are connected between two adjacent storage cells of a row.

12. High-temperature storage battery according to claim 11, wherein the two plates are connected to each other along the entire length of these two storage cells.

13. High-temperature storage battery according to claim 1, wherein each module has the storage cells arranged therein such that the module has a linear extent and maximally two storage cells are arranged in a plane which is perpendicular to the longitudinal axis of the module.

14. High-temperature storage battery according to claim 13, wherein the last pair of storage cells is provided at that end of a module with two mountings by means of which each module is directly fastened to the inner housing wall of the high-temperature storage battery.

15. High-temperature storage battery according to claim 13, wherein the last pair of storage cells is provided at that end of the module with two mountings by means of which each module is fastened a mounting frame which can be removed from the high-temperature battery.

16. High-temperature storage battery according to claim 1, wherein the storage cells of each module are arranged one after the other in pairs such that one storage cell of the next-following pair faces the gap formed between the two storage cells of the first preceding pair; and wherein the outer housing elements of adjacent storage cells are connected to each other by spot welding in the upper and lower region of the storage cells.

17. High-temperature storage battery according to claim 1, wherein each module is delineated against the directly adjacent modules by insulation; and wherein the storage cells of each module are mounted to provide areas of free spaces above the upper surface and below the lower boundary surfaces of the cells.

* * * * *